(12) United States Patent
Chiu et al.

(10) Patent No.: US 7,447,895 B2
(45) Date of Patent: *Nov. 4, 2008

(54) BIOS LOCKING DEVICE, COMPUTER SYSTEM WITH A BIOS LOCKING DEVICE AND CONTROL METHOD THEREOF

(75) Inventors: Li-Kuo Chiu, Taipei (TW); Bruce C. S. Chou, Hsin Chu (TW)

(73) Assignees: Aimgene Technology Co., Ltd., Taipei County (TW); Ligh Tuning Tech, Inc., Hsinchu (TW)

( * ) Notice: Subject to any disclaimer, the term of this patent is extended or adjusted under 35 U.S.C. 154(b) by 328 days.

This patent is subject to a terminal disclaimer.

(21) Appl. No.: 11/229,645

(22) Filed: Sep. 20, 2005

(65) Prior Publication Data

US 2006/0064577 A1 Mar. 23, 2006

(30) Foreign Application Priority Data

Sep. 21, 2004 (TW) .............................. 93128575 A

(51) Int. Cl.
*G06F 9/00* (2006.01)
(52) U.S. Cl. .......................................... 713/2; 713/189
(58) Field of Classification Search ...................... 713/2, 713/189
See application file for complete search history.

(56) References Cited

U.S. PATENT DOCUMENTS

| | | | |
|---|---|---|---|
| 6,513,075 B1 * | 1/2003 | Perkel et al. .................... 710/8 |
| 6,547,130 B1 | 4/2003 | Shen | |
| 7,174,463 B2 * | 2/2007 | Cromer et al. ............... 713/186 |
| 7,206,928 B2 * | 4/2007 | Chang ............................ 713/1 |
| 7,260,726 B1 * | 8/2007 | Doe et al. .................... 713/189 |
| 7,275,263 B2 * | 9/2007 | Bajikar et al. ................. 726/28 |
| 7,284,246 B2 * | 10/2007 | Kemp et al. .................. 719/321 |
| 7,310,432 B2 * | 12/2007 | Xu .............................. 382/115 |
| 2003/0005337 A1 * | 1/2003 | Poo et al. ..................... 713/202 |

FOREIGN PATENT DOCUMENTS

| TW | 473659 | 8/1989 |
|---|---|---|
| TW | 428755 | 6/1999 |

* cited by examiner

*Primary Examiner*—Thomas Lee
*Assistant Examiner*—Vincent T Tran
(74) *Attorney, Agent, or Firm*—Muncy, Geissler, Olds & Lowe, PLLC

(57) ABSTRACT

A BIOS locking device is connected to a BIOS chip of a computer apparatus to control a BIOS booting procedure. The computer apparatus communicates with a USB controller of the locking device via a communication protocol of a standard interface and recognizes this locking device as a USB-interface storage device. Then, the computer apparatus selects a fingerprint application program stored in a memory of the locking device according to a method of accessing a USB storage device and enables a fingerprint sensor to read a user's fingerprint so as to transfer to-be-identified fingerprint data corresponding to the fingerprint and an authorized data template previously stored in a main storage device of the computer apparatus to a main memory of the computer apparatus. A CPU of the computer apparatus compares the fingerprint data with the template, and allows the BIOS booting procedure if the comparison passes.

16 Claims, 2 Drawing Sheets

BIOS LOCKING DEVICE, COMPUTER SYSTEM WITH A BIOS LOCKING DEVICE AND CONTROL METHOD THEREOF

BACKGROUND OF THE INVENTION

1. Field of the Invention

The invention relates to a BIOS (Basic Input/Output System) locking device, a computer system having the BIOS locking device, and a control method thereof, and more particularly to a method of controlling a BIOS booting authority in a computer system having a fingerprint locking device. The invention correlates to U.S. patent application Ser. No. 10/998,722, filed on Nov. 30, 2004, and entitled "MEMORY STORAGE DEVICE WITH A FINGERPRINT SENSOR AND METHOD FOR PROTECTING THE DATA THEREIN".

2. Description of the Related Art

The conventional method for protecting the personal data is often made by way of password protection. However, using the password to protect the personal data is troublesome because the user tends to forget the password and the password may also be dangerously cracked.

Thus, adding a biometrics feature recognition device to replace the password input has become an important technological development. The fingerprint recognition device is used most frequently because the fingerprint recognition method is well developed.

In the prior art, the method of integrating the fingerprint recognition device in the computer to control the BIOS is mainly restricted by the specification of the commercial BIOS chip. For example, the storage space in the ROM of the BIOS chip of the computer is insufficient for the storing of the essential program codes and the fingerprint recognition program and the fingerprint template. Even the small minutia point recognition program needs at least 200 Kbytes of memory space. Thus, if the fingerprint sensor is simply and directly connected to the BIOS chip and the data are processed and compared by the CPU of the computer, it is still very difficult to use the commercial BIOS chip to store the fingerprint recognition program.

An independent fingerprint recognition device capable of acquiring the fingerprint data and comparing the fingerprint data with the template data may be connected to the computer without using the CPU of the computer for processing the fingerprint data and the template data. However, this independent fingerprint recognition device has a high selling price. For example, the image processing and recognizing module requires a high-level microprocessor, such as a 32-bit RISC processor or DSP chip, a large read only memory (ROM) for storing the recognition program, and a large random access memory (RAM). Thus, the independent recognition device cannot be easily popularized in the application of controlling the BIOS of the computer system.

SUMMARY OF THE INVENTION

It is therefore an object of the invention to provide a BIOS locking device, a computer system having the BIOS locking device, and a control method thereof, wherein the authority of booting the computer system is obtained by way of fingerprint identification so that the data in the computer system may be protected.

Another object of the invention is to provide a low-cost BIOS locking device without any build-in recognition processor, wherein the locking device may be connected to the computer system without modifying any hardware device of the computer system and the CPU of the computer downloads the program code of the BIOS chip and executes the fingerprint identification authentication to control the BIOS booting authority of the computer system.

Still another object of the invention is to provide a BIOS locking device with a build-in serial NOR flash having a small size, a large capacity, and a low cost such that the application program and the fingerprint biometrics data need not to be stored in the BIOS chip. Thus, only the device has to be configured, and the BIOS chip does not have to be modified. In addition, using the serial NOR flash can reduce the number of pins and the size of the USB controller so that the size of the device can be greatly reduced.

Yet still another object of the invention is to provide a BIOS locking device without additionally installed driver, wherein the biometrics sensor of the locking device is recognized as an independent memory, and the BIOS chip only needs to control this device.

Yet still another object of the invention is to provide a computer system, which has a BIOS locking device and is free from being influenced by the operation system, and a control method thereof.

To achieve the above-identified objects, the invention provides a computer system including a computer apparatus and a BIOS locking device. The computer apparatus includes a central processing unit (CPU), a main memory, a BIOS chip, a main storage device and a user interface. The BIOS locking device is connected to the computer apparatus through a USB interface and includes a USB controller, a biometrics sensor and a program memory. When the computer apparatus is turned on, the CPU downloads a program code stored in the BIOS chip to execute a hardware detecting and initializing operation, and then the program code enables the CPU to automatically download a driver and an application program, which are stored in the program memory, for the biometrics sensor to the main memory so as to perform a biometrics data enrolling operation or a biometrics data comparing operation. In the biometrics data enrolling operation, the CPU executes the application program to guide, through the user interface, an authorized user to enroll an authorized data template, the USB controller controls the biometrics sensor to sense authorized biometrics data of the authorized user, and the CPU reads the authorized biometrics data from the USB controller, processes the authorized biometrics data into the authorized data template, and stores the authorized data template in the main storage device. In the biometrics data comparing operation, the CPU executes the application program to guide, through the user interface, a to-be-identified user to perform an identification procedure, the USB controller controls the biometrics sensor to sense to-be-identified biometrics data of the to-be-identified user, the CPU reads the to-be-identified biometrics data from the USB controller, processes the to-be-identified biometrics data into to-be-identified data, compares the to-be-identified data with the authorized data template stored in the main storage device, and downloads an operation system stored in the main storage device to complete a booting operation when the to-be-identified data matches with the authorized data template.

The invention also provides a BIOS locking device used in the computer system and a control method thereof.

DETAILED DESCRIPTION OF THE INVENTION

The prior art cannot simply connect a biometrics sensor to a BIOS chip of a computer system directly and store the software of identifying the biometrics features in a ROM of the BIOS chip under the consideration of reducing the cost.

The BIOS (Basic Input/Output System) locking device of this invention is a storage device having a USB (Universal Serial Bus) interface, through which a BIOS chip of a computer is connected to the storage device. In order to reduce the cost and the size of the device of the invention, a serial NOR flash (hereinafter referred to as a NOR Flash, such as the product of Atmel AT45DB041B) is used instead of a NAND flash. This is because the commercial NAND flash has a capacity larger than 32 MB or even 64 MB, and a selling price higher than 3 U.S. Dollars. The invention device only needs the memory for storing a fingerprint recognition program and an authorized data template, which are usually smaller than 32 MB or 64 MB in size. Thus, the invention utilizes the serial NOR flash as the memory for storing the fingerprint recognition program and the authorized data template. The USB controller used in the invention device is the same as the USB controller used in the commercial thumb disk, and thus has the memory interface matching with the NAND flash. In the invention device, the NOR flash cannot be directly read through the interface for the NAND flash. In order to solve this problem, the method of the invention utilizes the redundant GPIO (General Purpose Input/Output) pins of the USB controller as the pins to be connected to the NOR flash, and simulates the NOR Flash into the memory having the data management format of the NAND flash through the software file management system. The invention utilizes the NOR Flash as the storage device and combines the NOR flash with the biometrics sensor to form the BIOS locking device. The biometrics data is processed and recognized using the processor of the computer apparatus, so the hardware cost of the BIOS locking device may be popularized.

The BIOS includes the hardware initialization/detection codes for initializing and detecting the hardware devices of the computer apparatus and then downloading the operation system from the main storage device and the sub-program codes for controlling the display of the monitor, driving the disk drive, controlling the joystick, and controlling other peripheral I/O devices. The codes are integrated into a BIOS chip when the IBM company configured the first personal computer since 1981. Integrating the BIOS locking device with the BIOS chip can provide the complete control and has no relationship with the operation system. Thus, the BIOS chip can communicate with the BIOS locking device of the invention in a manner of accessing the storage device without modifying the original structure of the BIOS chip. The details and applications of the invention will be described with reference to the accompanying drawings.

Figure 1:
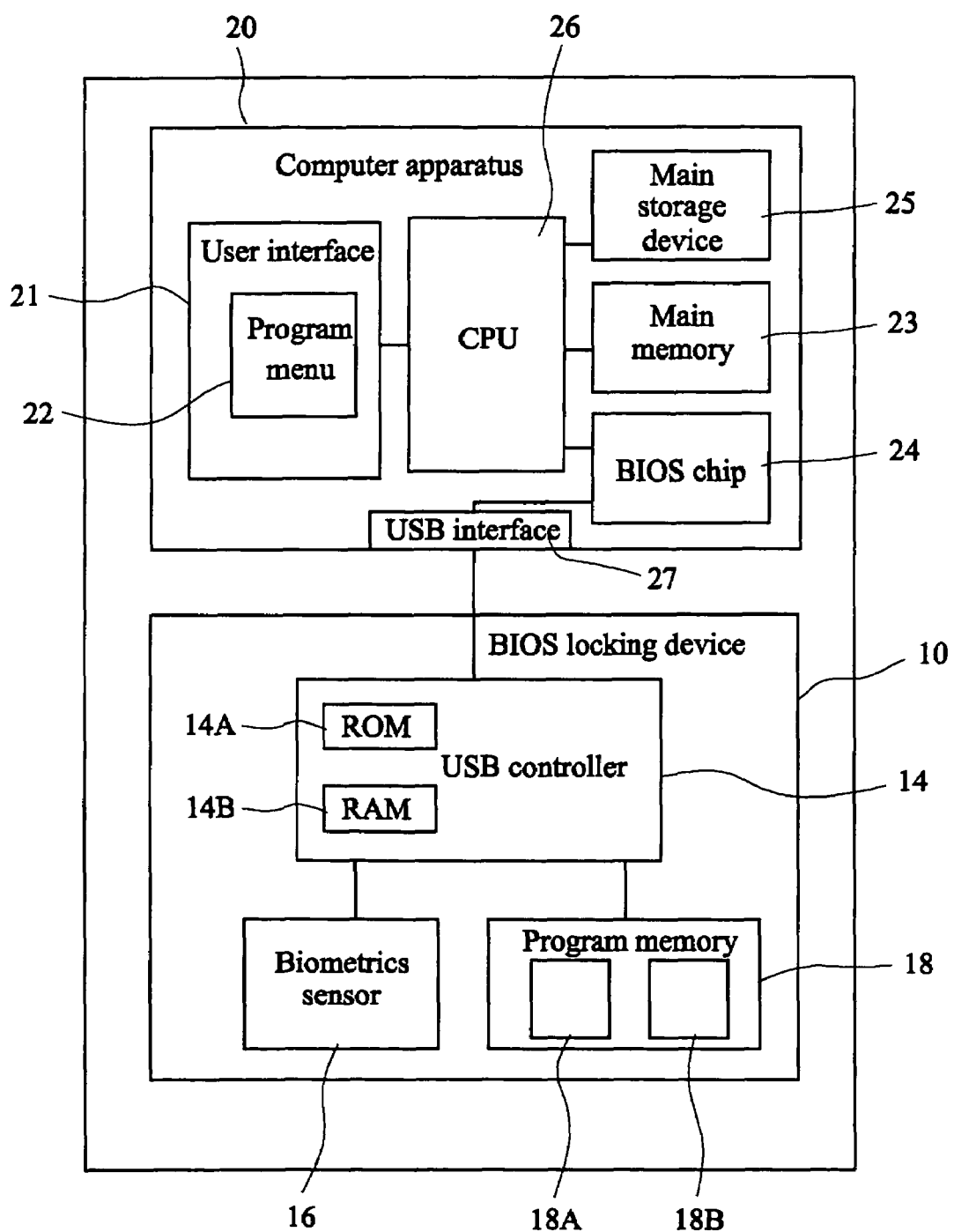
FIG. 1 is a block diagram showing a computer system having a BIOS locking device according to a preferred embodiment of the invention.

FIG. 1 is a block diagram showing a computer system 1 having a BIOS locking device 10 according to a preferred embodiment of the invention. As shown in FIG. 1, the BIOS locking device 10 of this embodiment is connected to a computer apparatus 20 to control the booting procedure of the computer. The computer apparatus 20 may be, for example, a personal computer (PC), a notebook computer, a personal digital assistant (PDA), or a mobile phone. The computer apparatus 20 basically includes a central processing unit (CPU) 26, a main memory 23, a BIOS chip 24, a main storage device 25 and a user interface 21, such as a display, a keyboard and/or a mouse. The BIOS chip 24 controls all the enabling procedures and the hardware communicating procedures.

The BIOS locking device 10 connected to the BIOS chip 24 through a USB interface 27 includes a USB controller 14, a biometrics sensor 16 and a program memory 18. The biometrics sensor 16 may be a fingerprint sensor, an audio sensor or an optical image sensor for sensing a face or an iris. In this embodiment, the fingerprint sensor is a chip-type fingerprint sensor, such as an area-type fingerprint sensor or a sweep-type fingerprint sensor, in order to satisfy the demand of miniaturized products. The program memory 18 and the biometrics sensor 16 are directly electrically connected to the USB controller 14 in parallel and are connected to the USB interface 27 through the USB controller 14.

The USB controller 14 may further include a ROM 14A and a RAM 14B. The ROM 14A stores the firmware for enabling the device 10 to be hot swapped in the computer apparatus 20. The firmware stored in the ROM 14A includes the communication protocol for the computer apparatus 20. When the power is on, the locking device is recognized as a USB storage device. Alternatively, the USB storage device may be simulated as disk "A:", and the computer apparatus 20 is configured to boot from disk "A:" in the DOS mode. Then, the computer apparatus 20 automatically links and accesses various application programs and data stored in the program memory 18 according to the method of accessing the storage device, and automatically downloads the programs and data to the main memory 23 of the computer apparatus 20 and executes the programs to perform a biometrics data enrolling operation or a biometrics data comparing operation. The RAM 14B serves as a buffer for data processing.

When the computer apparatus 20 is turned on, the CPU 26 downloads a program code stored in the BIOS chip 24 and executes a hardware detecting and initializing operation according to the program code. Then, the CPU 26 downloads an application program, which is stored in the program memory 18, to the main memory 23 through the BIOS chip 24, and executes the biometrics data enrolling operation or the biometrics data comparing operation accordingly. The computer apparatus 20 can automatically judge to execute the biometrics data enrolling operation or the biometrics data comparing operation.

The program memory 18 connected to the USB controller 14 stores the application program. The program memory 18 may include a public block 18A for storing the application program, and a private block 18B for storing the personal identification data and an authorized data template. Furthermore, the public block 18A may store an encrypting/decrypting application program and the private block 18B may store an encrypting/decrypting key and the personal identification data, such as the name and the address. Thus, the CPU 26 can download the encrypting/decrypting application program and the encrypting/decrypting key to encrypt/decrypt the personal identification data.

In one embodiment, the locking device of the invention may be embedded in the computer apparatus, and the program memory is the serial NOR flash. In another embodiment, the locking device may be an external USB key with the serial NOR flash, and the USB key itself may simply serve as the control key for the computer apparatus. Alternatively, the locking device may be combined with a fingerprint thumb disk so that two functions may be provided. In this case, the memory is the NAND flash, the locking device can serve as the memory storage device capable of protecting data, and the BIOS locking device capable of controlling the booting of the computer apparatus. In this case, the computer apparatus may be configured such that the booting operation is disabled when the BIOS locking device is disconnected from the computer apparatus.

In still another embodiment of the invention, all integrated circuit devices and the sensor in the locking device may be integrated on a single chip, which is advantageous to the reductions of the cost and the size.

The program code in the BIOS chip 24 enables the chip 24 to acquire the fingerprint image by way of accessing the storage device and recognizing the biometrics sensor 16 as a memory block. When the application program is downloaded, it is judged whether the device is used for the first time. If yes, the fingerprint sensor is enabled to read a fingerprint of a user and process the read fingerprint into an authorized data template, which may include multiple fingerprint data templates of one authorized user or multiple fingerprint data templates of multiple authorized users.

In the biometrics data enrolling operation, the CPU 26 executes the application program to guide an authorized user, through a program menu 22 on the user interface 21, to perform the enrolling operation. The USB controller 14 controls the biometrics sensor 16 to sense authorized biometrics data of the authorized user. Then, the CPU 26 reads the authorized biometrics data from the biometrics sensor 16 connected to the USB controller 14 in a manner of reading the storage device, processes the authorized biometrics data into an authorized data template, and stores the authorized data template in the main storage device 25.

In the biometrics data comparing operation, the CPU executes the application program to guide, through the user interface, a to-be-identified user to perform the comparing operation. The USB controller controls the biometrics sensor to sense to-be-identified biometrics data of the to-be-identified user. Then, the CPU reads the to-be-identified biometrics data from the USB controller in a manner of reading the storage device, processes the to-be-identified biometrics data into to-be-identified data, and compares the to-be-identified data with the authorized data template stored in the main storage device. If a match occurs, the CPU downloads an operation system stored in the main storage device to complete the booting procedure.

At the moment when the computer system is turned on, the system hardware is configured to enable the CPU 26 to get the program code from the BIOS chip 24 and to get the control right. Then, the CPU 26 operates in the foreground to detect the internal and external settings, enable the main memory 23, initialize the chipset and the peripheral chip, and finally drive the main storage device 25 (e.g., a disk drive) to download the operation system and complete the booting procedure. Then, the BIOS chip 24 operates in the background to coordinate the works and help the operation system or the application program to process the detailed operations of the peripheral devices. The locking device 10 may be recognized as the extension of the storage and the program code of the BIOS chip 24, and the BIOS chip 24 is configured such that the USB controller 14 communicates with the computer apparatus 20 by handshakes before the BIOS chip 24 enables the main storage device 25 to download the operation system. The locking device 10 informs the computer apparatus 20 that it is a storage device. Then, the computer apparatus 20 accesses various application programs and data in the program memory 18 of the locking device 10 in a conventional manner of accessing a storage device. The computer apparatus 20 can judge whether the BIOS locking device 10 has been initialized. If yes, the computer apparatus 20 calls the application program stored in the BIOS locking device 10 to read the fingerprint first and completes the enrolling of the authorized data template. When the BIOS locking device 10 has to be enabled using the fingerprint, the computer apparatus 20 executes the application program to display the application program menu 22 on the user interface 21 (e.g., a monitor) so that the user can make a selection. The USB controller 14 uploads one of the application programs suitable for the computer apparatus 20 to the main memory 23 of the computer apparatus 20 according to a selection result of the user on the application program menu 22, completes the installation of the application program, and then uploads the authorized data template to the computer apparatus 20.

Then, the USB controller 14 controls the fingerprint sensor 16 to read the fingerprint of the to-be-identified user according to the application program executed in the computer apparatus 20, and then transfers to-be-identified fingerprint data corresponding to the fingerprint to the computer apparatus 20. The computer apparatus 20 processes the to-be-identified fingerprint data and judges whether or not the to-be-identified fingerprint data matches with the authorized data template stored in the main storage device. If yes, the CPU downloads the operation system from the main storage device 25 (e.g., a disk drive) and completes the booting procedure.

Figure 2:
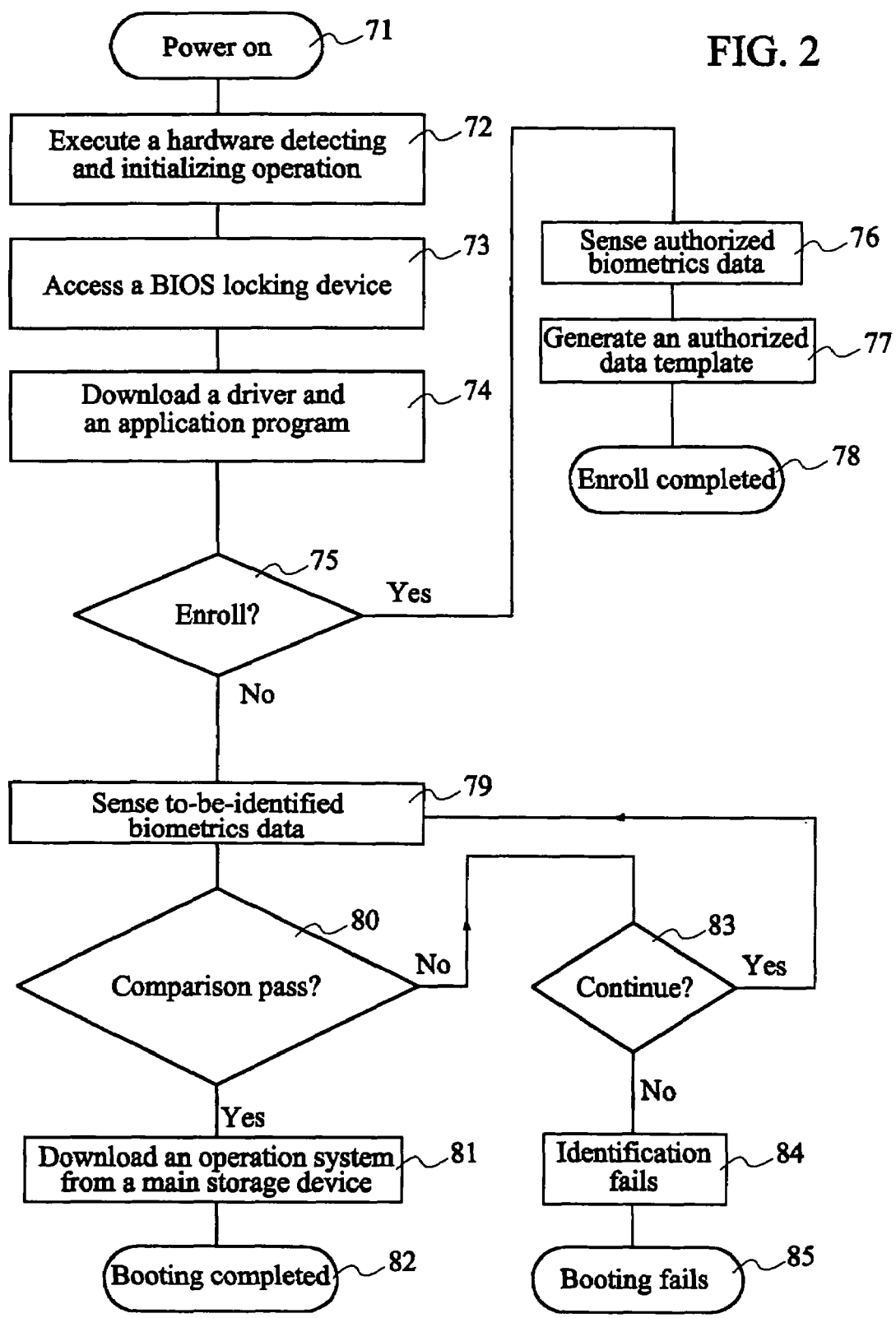
FIG. 2 is a flow chart showing a control method used in the computer system having the BIOS locking device according to the preferred embodiment of the invention.

FIG. 2 is a flow chart showing a control method used in the computer system having the BIOS locking device according to the preferred embodiment of the invention. As shown in FIG. 2, the control method of the invention includes the following steps.

First, step 71 turns on the computer system. Then, step 72 enables the CPU to download a program code stored in the BIOS chip and execute a hardware detecting and initializing operation. Next, step 73 accesses the BIOS locking device. Then, the CPU downloads through the USB controller 14, a driver for the biometrics sensor and an application program, which are stored in the program memory of the BIOS locking device, to a main memory of the computer apparatus, as shown in step 74. One of ordinary skill in the art may easily understand that the driver and the application program may be contained in a file. Next, the computer apparatus automatically judges whether to perform the biometrics data enrolling operation or the biometrics data comparing operation, as shown in step 75. In other words, the computer system automatically judges whether the authorized data template exists, and performs the biometrics data enrolling operation if not, or performs the biometrics data comparing operation if yes. If the enrolling operation is to be performed, the CPU executes the application program to guide, through the user interface, the authorized user to enroll the data. The USB controller controls the biometrics sensor to sense the authorized biometrics data of the authorized user (step 76), and the CPU reads the authorized biometrics data through the USB controller in a manner of reading the main storage device, processes the authorized biometrics data into an authorized data template (step 77), and stores the authorized data template in the main storage device 25.

If the authorized data template exists, the biometrics data comparing operation will be performed. In this case, the CPU executes the application program to guide, through the user interface, the to-be-identified user to perform an identification procedure, and the USB controller controls the biometrics sensor to sense the to-be-identified biometrics data of the to-be-identified user (step 79). Then, the CPU reads the to-be-identified biometrics data from the USB controller in a manner of reading a main storage device, processes the to-be-identified biometrics data into to-be-identified data, and compares whether the to-be-identified data matches with the authorized data template stored in the main storage device (step 80). If yes, the CPU downloads the operation system stored in the main storage device (step 81) to complete a booting operation (step 82). If not, the apparatus asks the user whether he or she wants to perform the identification procedure again (step 83). If the user selects to perform the identification procedure again, the procedure goes back to step 79; or otherwise the identification procedure fails (step 84) and the apparatus cannot be booted (step 85).

Using the BIOS locking device of the invention does not need to install any driver and identification software in the BIOS chip of the computer apparatus. The BIOS program in the computer apparatus communicates with the USB controller of the BIOS locking device only through the communication protocols of the USB interface, and the locking device is recognized as a storage device. Then, the computer apparatus selects the application program for the locking device and downloads the application program to the main memory of the computer apparatus in a manner of accessing a storage device, and executes the application program. Meanwhile, the data and/or program stored in the program memory of the BIOS locking device are encrypted by the personal feature such as the fingerprint. So, the contents stored in the memory cannot be correctly read as the device is disconnected from the computer apparatus. Alternatively, the security problem caused by the replacement of the locking device can be solved by encrypting the contents in the hard disk according to the fingerprint, or enabling the BIOS chip to check the serial number of the locking device.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A BIOS (Basic Input/Output System) locking device connected to a computer apparatus, which comprises a central processing unit (CPU), a main memory, a BIOS chip, a main storage device, a user interface and a USB (Universal Serial Bus) interface, the BIOS locking device being connected to the computer apparatus via the USB interface, the BIOS locking device comprising:
   a USB controller,
   a biometrics sensor; and
   a program memory, wherein:
   the program memory and the biometrics sensor of the BIOS locking device are directly electrically connected to the USB controller in parallel, and are connected to the USB interface through the USB controller;
   when the computer apparatus is turned on, the CPU downloads a program code stored in the BIOS chip to execute a hardware detecting and initializing operation, and then the program code enables the CPU to automatically download a file, which is stored in the program memory, for the biometrics sensor to the main memory through the USB controller so as to perform a biometrics data enrolling operation or a biometrics data comparing operation, wherein
   in the biometrics data enrolling operation, the CPU executes the file to guide, through the user interface, an authorized user to enroll an authorized data template, the USB controller controls the biometrics sensor to sense authorized biometrics data of the authorized user, and the CPU reads the authorized biometrics data from the USB controller, processes the authorized biometrics data into the authorized data template, and stores the authorized data template; and
   in the biometrics data comparing operation, the CPU executes the file to guide, through the user interface, a to-be-identified user to perform an identification procedure, the USB controller controls the biometrics sensor to sense to-be-identified biometrics data of the to-be-identified user, the CPU reads the to-be-identified biometrics data from the USB controller, processes the to-be-identified biometrics data into to-be-identified data, compares the to-be-identified data with the authorized data template, and downloads an operation system stored in the main storage device to complete a booting operation when the to-be-identified data matches with the authorized data template.

2. The device according to claim 1, wherein the program memory comprises:
   a public block for storing the file; and
   a private block for storing personal identification data and the authorized data template.

3. The device according to claim 2, wherein the public block further stores an encrypting/decrypting application program, the private block further stores an encrypting/decrypting key, and the CPU downloads the encrypting/decrypting application program and the encrypting/decrypting key to encrypt/decrypt the personal identification data.

4. The device according to claim 1, wherein the program memory is a NOR memory or a NAND memory.

5. The device according to claim 1, wherein the biometrics sensor is a fingerprint sensor, an audio sensor or an optical image sensor.

6. A computer system, comprising:
   a computer apparatus comprising a central processing unit (CPU), a main memory, a BIOS (Basic Input/Output System) chip, a main storage device, a user interface and a USB (Universal Serial Bus) interface; and
   a BIOS locking device, which is connected to the computer apparatus through the USB interface and comprises a USB controller, a biometrics sensor and a program memory, wherein the program memory and biometrics sensor of the BIOS locking device are directly electrically connected to the USB controller in parallel and are connected to the USB interface through the USB controller;
   wherein when the computer system is turned on, the CPU downloads a program code stored in the BIOS chip and executes a hardware detecting and initializing operation according to the program code, and then the program code enables the CPU to automatically download a file, which is stored in the program memory, for the biometrics sensor to the main memory through the USB controller so as to perform a biometrics data enrolling operation or a biometrics data comparing operation;
   in the biometrics data enrolling operation, the CPU executes the file to guide, through the user interface, an authorized user to enroll an authorized data template, the USB controller controls the biometrics sensor to sense authorized biometrics data of the authorized user, and the CPU reads the authorized biometrics data from the USB controller, processes the authorized biometrics data into the authorized data template, and stores the authorized data template in the main storage device; and
   in the biometrics data comparing operation, the CPU executes the file to guide, through the user interface, a to-be-identified user to perform an identification procedure, the USB controller controls the biometrics sensor to sense to-be-identified biometrics data of the to-beidentified user, the CPU reads the to-be-identified biometrics data from the USB controller, processes the to-be-identified biometrics data into to-be-identified data, compares the to-be-identified data with the authorized data template stored in the main storage device, and downloads an operation system stored in the main storage device to complete a booting operation when the to-be-identified data matches with the authorized data template.

7. The system according to claim 6, wherein the program memory comprises:
   a public block for storing the file; and
   a private block for storing personal identification data and the authorized data template.

8. The system according to claim 7, wherein the public block further stores an encrypting/decrypting application program, the private block further stores an encrypting/decrypting key, and the CPU downloads the encrypting/decrypting application program and the encrypting/decrypting key to encrypt/decrypt the personal identification data.

9. The system according to claim 6, wherein the program memory is a NOR memory.

10. The system according to claim 6, wherein the biometrics sensor is a fingerprint sensor, an audio sensor or an optical image sensor.

11. The system according to claim 6, wherein the computer apparatus automatically judges to execute the biometrics data enrolling operation or the biometrics data comparing operation.

12. The system according to claim 6, wherein the computer apparatus is configured such that the booting operation is disabled when the BIOS locking device is disconnected from the computer apparatus.

13. A control method used in a computer system having a BIOS (Basic Input/Output System) locking device, the method comprising the steps of:
   enabling a CPU (Central Processing Unit) to download a program code, which is stored in a BIOS chip, to execute a hardware detecting and initializing operation; and
   enabling the CPU to download through a USB controller, a file stored in a program memory, for a biometrics sensor to a main memory, so as to perform a biometrics data enrolling operation or a biometrics data comparing operation, wherein:

in the biometrics data enrolling operation, the CPU executes the file to guide, through a user interface, an authorized user to enroll an authorized data template, a USB (Universal Serial Bus) controller controls the biometrics sensor to sense authorized biometrics data of the authorized user, and the CPU reads the authorized biometrics data through the USB controller, processes the authorized biometrics data into the authorized data template, and stores the authorized data template in a main storage device; and in the biometrics data comparing operation, the CPU executes the file to guide, through the user interface, a to-be-identified user to perform an identification procedure, the USB controller controls the biometrics sensor to sense to-be-identified biometrics data of the to-be-identified user, the CPU reads the to-be-identified biometrics data from the USB controller, processes the to-be-identified biometrics data into to-be-identified data, compares the to-be-identified data with the authorized data template stored in the main storage device, and downloads an operation system stored in the main storage device to complete a booting operation when the to-be-identified data matches with the authorized data template, and the program memory and the biometrics sensor of the BIOS locking device are directly electrically connected to the USB controller in parallel.

14. The method according to claim 13, wherein the program memory comprises:
   a public block for storing the file; and
   a private block for storing personal identification data and the authorized data template.

15. The method according to claim 14, wherein the public block further stores an encrypting/decrypting application program, the private block further stores an encrypting/decrypting key, and the CPU downloads the encrypting/decrypting application program and the encrypting/decrypting key to encrypt/decrypt the personal identification data.

16. The method according to claim 13, further comprising the step of:
   automatically judging whether or not the computer system has the authorized data template, and executing the biometrics data enrolling operation if not or executing the biometrics data comparing operation if yes.

* * * * *